UNITED STATES PATENT OFFICE.

JAMES F. BABCOCK, OF BOSTON, MASSACHUSETTS, ASSIGNOR TO HIMSELF AND JOSEPH DAVIS, OF SAME PLACE.

IMPROVEMENT IN PROCESSES OF BLEACHING AND CLARIFYING FATS.

Specification forming part of Letters Patent No. 156,404, dated November 3, 1874; application filed July 28, 1874.

*To all whom it may concern:*

Be it known that I, JAMES F. BABCOCK, of Boston, in the county of Suffolk and State of Massachusetts, have invented a new and useful Process for Clarifying and Bleaching Fats and Fatty Oils; and I hereby declare that the following is a full, clear, and exact description of the same.

This invention relates to an improved process for refining and bleaching all of the oils known as fatty oils, such as lard-oil, vegetable oils, neat's-foot oil, whale-oil, sperm-oil, fish-oils, &c.

These oils are often dark-colored and offensive in consequence of the presence of decomposing organic matter. My improved process is intended to remove these impurities and render the oil sweet and light-colored, and my process may be also applied to lard, grease, and other solid fats.

To enable others skilled in the art to understand and use my invention, I will proceed to describe the manner in which I have carried it out.

I first add to every hundred (100) gallons of oil three or four gallons of good yeast; or, instead of yeast, about half a pound of putrid cheese, mixed with water to reduce it to a thin paste, may be added to the oil, and the whole well agitated. The oil is kept warm, but at a temperature not exceeding 100° Fahrenheit. Fermentation soon sets in, and the albuminous and mucilaginous matters in the oil are decomposed and rendered susceptible to chemical agents, to be used as hereinafter described. The yeast should remain in contact with the oil for about ten days, after which it is allowed to settle, and the oil is then drawn off into another vessel. This treatment with the yeast or other ferment decomposes all albuminous and mucilaginous matter in the oil.

I then submit the oil to chemical treatment for removing the residuary products of the decomposition which has been produced by the yeast. For this purpose I employ the following mixture: Permanganate of soda, one ounce; sulphuric acid, two ounces; water, one gallon. The permanganate of soda is dissolved in the water, and the acid added, and one gallon of this solution is agitated with five gallons of oil, or in that proportion for any quantity, namely, twenty per cent. of the above solution. After agitation, the oil separates and rises, when it is drawn off, and, after being well washed by agitation with water, is ready for use.

I am aware that matter in a state of fermentation has heretofore been introduced into oils subsequent to their treatment with chemicals for bleaching and purifying, in order that by its intestine action it may remove, by settling, the mechanical impurities in the oil.

This is essentially different from the operation of the yeast, as a step in my process. I put the yeast into the oil before treating with chemicals, so that actual fermentation may ensue, and the albuminous and mucilaginous matters in the oil may be broken up, so as to allow a speedy and economical action by the chemicals subsequently used.

The oil thus prepared is free from odor, nearly colorless, and greatly superior in every respect to the crude oil, either for lubricating, burning, currying, or other purposes.

What I claim as my invention, and desire to secure by Letters Patent, is—

1. The process of clarifying and purifying fatty oils by treating them under agitation with yeast to break up the albuminous and mucilaginous matters, and subsequently treating them with sulphuric acid, permanganate of soda, and water, as set forth.

2. In the process of clarifying fatty oils, a mixture of permanganate of soda, sulphuric acid, and water, for destroying the coloring matter, substantially as described.

Witness my hand this 22d day of July, A. D. 1874.

JAS. F. BABCOCK.

In presence of—
P. E. TESCHEMACHER,
W. J. CAMBRIDGE.